UNITED STATES PATENT OFFICE.

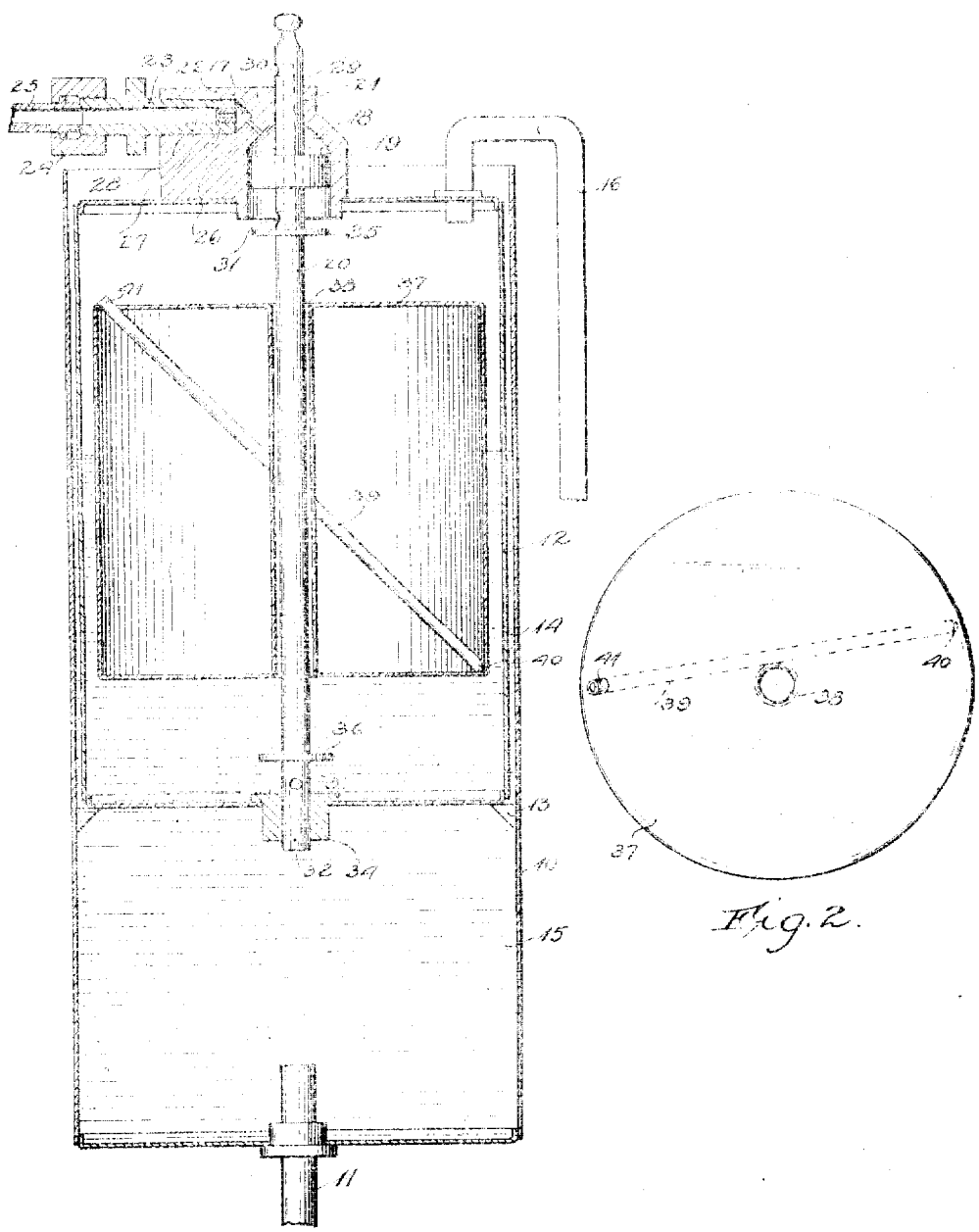

WILFRED SHURTLEFF, OF MOLINE, ILLINOIS.

VACUUM FUEL-FEEDING SYSTEM FOR GAS-ENGINES.

1,241,039.  Specification of Letters Patent.  Patented Sept. 25, 1917.

Application filed March 12, 1917. Serial No. 154,152.

*To all whom it may concern:*

Be it known that I, WILFRED SHURTLEFF, a citizen of the United States, and a resident of Moline, in the county of Rock Island and State of Illinois, have invented certain new and useful Improvements in Vacuum Fuel-Feeding Systems for Gas-Engines, of which the following is a specification.

My invention relates to vacuum fuel feeding systems for gas engines and particularly to an improved form of float for coöperating with the other elements of the system to control the oil flow with greater certainty and efficiency.

In the class of fuel feeding systems referred to, closed floats are now usually constructed of thin sheet metal, and where such floats are closed or sealed there has been considerable trouble and uncertainty of operation. This is on account of the existing extreme differences of pressure between the inside of the float itself and the outside of the float. When the float is sealed its interior is primarily at atmospheric pressure, but as the float chamber or the space outside of the float is subjected to reduced pressures or vacuum effect during operation of the engine with which the fuel feed mechanism is associated, the metal of the float is subjected to continuous and considerable strain. As soon as the pressure outside of the float is reduced below atmospheric pressure, the air within the float tends to expand and such expansion pressure is exerted on the float walls. Then, when the pressure outside the float is again restored to that of the atmosphere, the float walls are released from strain. As a result of such continuous strain and release from strain, the float walls are constantly vibrated and eventually crack or break, and then the certainty of operation and the efficiency of the float is destroyed, for as soon as the outside of the float is subjected to vacuum the expansion within the float will force out some of the air, and if the air leak is below the level of the fuel fluid, fluid will be sucked into the float as soon as the suction or vacuum effect is removed from outside the float. When the air in the float is again expanded and more air escapes, more fluid will be sucked into the float when the pressure at the outside thereof is increased, and this fluid within the float of course materially increases the specific gravity of the float structure, and its movement relative to the valves to be controlled thereby is no longer correct and the valves will be improperly controlled and the efficiency of the feeding device will be correspondingly impaired, or the device will cease functioning.

An important object of my invention is therefore to construct a float or to provide an attachment therefor which will at all times equalize the pressure between the outside and the inside of the float to thereby eliminate any strains on the float walls and leakage therethrough, and which improved construction or attachment will immediately remove from the float any liquid that might enter therein through small leaks that might occur, as for example on account of a defective seam, or corrosion, or through pores.

More in detail, my invention involves the application of an open-ended tube or pipe extending from the bottom of the closed float to the outside thereof at some point which will always be above the level of the fuel fluid. With this arrangement, any vacuum effect within the float chamber can be communicated to the float interior and the pressure equalized, thus avoiding strains. If, by chance, any fluid should have found its way into the float, the suction will draw it out to the exterior through the pipe.

On the accompanying drawing I have shown my invention applied to the float of a fuel feeding mechanism such as is disclosed in my co-pending application Serial No. 48,769 filed September 3, 1915, but it is evident that such a float can be as readily used in fuel feeding systems of different construction, and is in fact capable of being used in any system where there is a variable pressure. In the drawing—

Figure 1 is a vertical diametral sectional view of the feed controlling mechanism, and Fig. 2 is a plan view of the float.

Referring to the drawing, 10 represents a sheet metal tank of cylindrical form open at its upper end and provided through its base with an outlet pipe 11 which in practice is connected with the carbureter of a gas engine. Within the tank is the cylindrical float vessel 12 closed at the top and bottom and supported on brackets 13 extending from the tank. The vessel 12 is of slightly less diameter than the tank 10 to leave the annular vertical passageway 14 to atmosphere from the space 15 of the tank 10 below the vessel 12. A pipe 16 connects the upper end of the vessel 12 with a main oil supply tank, which in practice is below the level of the tank 10. Mounted on the top wall of the float vessel 12 is a frame 17 in the form of a casting providing the piston chamber 18 for the piston 19 which is mounted on the valve stem 20 extending axially through the chamber and vessel with its upper end projecting through the guide passageway 21 in the frame 17. The frame has the laterally extending threaded passageway 22 for receiving the nipple 23 which is adapted by coupling 24 for connection with pipe 25 which in practice leads to the manifold of the engine. A small passageway 26 connects the inner end of the passageway 22 with the upper part of the piston chamber 18, and in the nipple 23 there is a plug 27 which has a fine reducing passageway 28 therethrough for controlling the flow of air from the float vessel to the manifold. The piston 19 does not fit tightly in its chamber but is of sufficiently reduced diameter to leave a very fine restricted annular passageway between it and the chamber walls for the flow of air.

The upper part of the stem 20 has the longitudinal passageway 29 therethrough connected at its ends with the exterior of the stem by upper and lower lateral ports 30 and 31 respectively, the arrangement being such that when the piston has moved upwardly a distance in chamber 18 the upper port 30 will be in communication with atmosphere, and when the piston is down the port 30 will be inside the opening 21 in the frame 17, so that when the piston is up the float vessel will have connection with atmosphere, and when the piston is down such atmosphere connection will be cut off.

Extending upwardly a distance from the lower end of the valve stem 20 is the longitudinal passageway 32 connected with the lateral port 33, and the base of the vessel 12 carries a block 34 having an opening through which the lower end of the valve stem extends. The arrangement is such that when the piston 19 is up and the float vessel is connected with atmosphere, the port 33 will be above the block 34 to connect the float vessel with the space 15, and when the piston 19 is down the port 33 will be inside the block 34 to disconnect the float vessel from the space 15.

The valve stem carries upper and lower abutment plates 35 and 36 and a cylindrical closed float 37 of sheet metal receives the stem between the plates through its central passageway or core 38, and is readily slidable on the stem between the plates, it being of less height than the distance between the plates. The arrangement is such that when there is sufficient oil in the float vessel the float will be raised against the plate 35 to shift the valve stem 20 upwardly to connect passageway 29 with the atmosphere, and when the oil level decreases below a minimum the plate will engage the lower abutment plate 36 and will shift the valve stem to its lower position.

During operation of the fuel feed mechanism described, the float will be up when there is sufficient oil in the float vessel, and the stem will be up sufficiently to expose the air inlet port 30 to atmosphere, and the suction of the engine manifold acting through the restricted passageway 28 will draw in air through the passageway 29, and the suction effect on the oil inlet pipe 16 will be destroyed so that the oil stops flowing. As soon as the level of the oil drops in the vessel 12 and the float sinks into engagement with the plate 36, the stem will be shifted downwardly to bring the port 30 within the frame 17 so that thereafter the suction will be effective to draw in oil through the pipe 16 to refill the vessel 12. When the stem is up and the suction effect is removed from the vessel 12 the port 33 will be open to the vessel and oil will flow therefrom through passageway 32 to the tank 10. When the stem is down the port 33 will be closed to the vessel 12, and during this time the carbureter draws from the tank 10.

The closed float in a fuel feeding system like that described is thus continually subjected to differences in pressure, the float when constructed and sealed being at atmospheric pressure on the inside, and when the float is assembled in the feeding mechanism it is alternately subjected to atmosphere and suction or vacuum on the outside, and this causes the strains and eventual cracking or breaking referred to hereinbefore.

Describing now the means for eliminating such pressure differences and consequent strains and for draining the float of any fluid that might get therein, a simple and efficient expedient is to provide a pipe 39 inside the float with its inner end 40 opening to the lowest point of the float and its upper end 41 extending through the float wall and opening into the float chamber at a point where such end will always be above the level of the fluid in the float chamber. With this arrangement, the float is closed so far as is association with the fluid is concerned, while at the same time the float interior is open through pipe 39 to the space in the fuel vessel above the fluid, and this prevents the existence of differences in pressure on the inside and outside of the float.

The operation is evident. Suppose that, as shown on the drawing, the float vessel is open to atmosphere through the passageway 29 in the raised stem. There will then be atmospheric pressure at the inside and outside of the float. As soon as the fuel level drops and the float follows and causes closure of the atmosphere inlet, and the suction becomes effective in the float vessel, the air within the float at atmospheric pressure will immediately endeavor to escape and can readily do so through the pipe 39 and flow through the pipe will immediately equalize the inside and outside pressures. Now, if by chance any fluid had leaked into the float, the air in the float as it expands and tries to escape would first have to eject such fluid out of the float through the pipe 39 before it could itself escape. Thus every time the pressure outside the float is less than that on the inside, the excess pressure will first eject any fluid from within the float and will then escape itself to make the pressure at the inside equal to that at the outside.

Thus my improved float eliminates any pressure conditions which might cause straining of the float walls and eventual leakage therethrough, and during operation of the fuel feed or other device in which the float is utilized any fluid which might enter is immediately discharged so that the specific gravity of the float remains constant and the float will always coöperate in the most efficient manner with the valves or other elements.

Without limiting myself to the exact details of construction shown and described, I claim as follows:

1. The combination with a fluid container, of a hollow float supported by the fluid in said container and closed to the direct entrance of fluid, means for intermittently changing the pressure in said container with reference to the pressure at the inside of said float, and means controlled by such differences in pressure between the inside and outside of said float for preventing the accumulation of leakage fluid within the float.

2. The combination with a fluid container, of a hollow float supported by the fluid in the container and closed to the direct entrance of fluid, means for alternately increasing and decreasing the pressure within the container with reference to the pressure within the float, and a pipe in said float extending from the interior to the exterior thereof through which the interior and exterior pressure may equalize and through which fluid which may have leaked into the float is forced to the exterior during expansion within the float.

3. The combination with a fluid container, of a hollow float supported by the fluid in the container and closed to the direct entrance of fluid, means for alternately increasing and decreasing the pressure within the container with reference to the pressure within the float, and means forming a passageway from the interior of the float at the bottom thereof to the exterior thereof above the fluid level, through which passageway the outside and inside pressures may equalize and through which any fluid which may have leaked into the float is forced to the exterior during expansion within the float.

4. The combination with a closed hollow float, of a pipe open at one end to the float interior at the bottom thereof and open at its other end to the exterior of the float at the top thereof.

5. The combination with a fuel container, of a float supported by the fuel in the container and closed to the direct entrance of fluid, said float having a passageway open at one end to the float interior at the bottom thereof and open at its other end to the exterior of the float at a point above the fluid level.

6. The combination of a fuel container, of fluid partly filling said container, a sheet metal float guided to reciprocate in said container with the rising and falling fluid, means for subjecting the interior of the container alternately to pressure and vacuum, a pipe leading from the bottom of said float to the exterior thereof above the fluid level, said float being otherwise entirely closed to the air or the fluid within the container.

In witness whereof I have hereunto subscribed my name this 8th day of March, A. D., 1917.

WILFRED SHURTLEFF.